United States Patent
Wunderlich et al.

(10) Patent No.: US 12,404,396 B2
(45) Date of Patent: Sep. 2, 2025

(54) MODELING COMPOUND AND USE THEREOF AND ARTICLES PRODUCED THEREBY

(71) Applicant: STAEDTLER MARS GMBH & CO. KG, Nuremberg (DE)

(72) Inventors: Laura Wunderlich, Nuremberg (DE); Denise Schneider, Nuremberg (DE); Mathias Belzner, Cadolzburg (DE)

(73) Assignee: STAEDTLER SE, Nuremberg (DE)

( * ) Notice: Subject to any disclaimer, the term of this patent is extended or adjusted under 35 U.S.C. 154(b) by 1027 days.

(21) Appl. No.: 17/281,825

(22) PCT Filed: Oct. 2, 2019

(86) PCT No.: PCT/EP2019/025330
§ 371 (c)(1),
(2) Date: Mar. 31, 2021

(87) PCT Pub. No.: WO2020/069777
PCT Pub. Date: Apr. 9, 2020

(65) Prior Publication Data
US 2022/0017735 A1 Jan. 20, 2022

(30) Foreign Application Priority Data
Oct. 2, 2018 (DE) .................... 10 2018 007 756.0

(51) Int. Cl.
| | | |
|---|---|---|
| *C08L 27/06* | (2006.01) | |
| *A63H 33/00* | (2006.01) | |
| *C08K 5/00* | (2006.01) | |
| *C08K 5/11* | (2006.01) | |
| *C08K 5/12* | (2006.01) | |
| *C08K 7/02* | (2006.01) | |
| *C08L 23/06* | (2006.01) | |
| *C08L 23/12* | (2006.01) | |
| *C08L 67/00* | (2006.01) | |

(52) U.S. Cl.
CPC .............. *C08L 27/06* (2013.01); *A63H 33/00* (2013.01); *C08K 5/0016* (2013.01); *C08K 5/11* (2013.01); *C08K 5/12* (2013.01); *C08K 7/02* (2013.01); *C08K 2201/004* (2013.01); *C08L 23/06* (2013.01); *C08L 23/12* (2013.01); *C08L 67/00* (2013.01)

(58) Field of Classification Search
CPC .......... C08L 27/06; C08L 23/06; C08L 23/12; C08L 67/00; A63H 33/00; C08K 5/0016; C08K 5/11; C08K 5/12; C08K 7/02; C08K 2201/004
See application file for complete search history.

(56) References Cited

U.S. PATENT DOCUMENTS

| | | | |
|---|---|---|---|
| 3,607,593 A | 9/1971 | Semenzato | |
| 2009/0288359 A1* | 11/2009 | Martin, Jr. | ........ E04F 15/02172 428/297.4 |
| 2013/0066000 A1 | 3/2013 | Freese | |

FOREIGN PATENT DOCUMENTS

| | | |
|---|---|---|
| DE | 1109640 A | 6/1961 |
| DE | 1806990 A | 6/1969 |
| DE | 3131456 A1 | 2/1983 |
| DE | 2515757 C3 | 8/1984 |
| DE | 102005011692 A1 | 9/2005 |
| DE | 202005019340 U1 | 1/2007 |
| DE | 102005059143 A1 | 6/2007 |
| DE | 202009002211 U1 | 6/2009 |
| GB | 842492 A | 7/1960 |
| GB | 1505697 A | 3/1978 |
| JP | H0852773 A * | 2/1996 |
| WO | 02094561 A1 | 11/2002 |

OTHER PUBLICATIONS

English language machine translation of DE 3131456. (Year: 1983).*
English Machine Translation of JP H0852773. (Year: 1996).*

* cited by examiner

*Primary Examiner* — Angela C Scott
(74) *Attorney, Agent, or Firm* — LUCAS & MERCANTI, LLP; Klaus P. Stoffel

(57) ABSTRACT

A modeling compound having at least one binder including plastisol and at least one filler and optionally other substances. The plastisol is composed essentially of PVC and plasticizers, wherein the at least one filler is in the form of plastic fibers.

10 Claims, No Drawings

MODELING COMPOUND AND USE THEREOF AND ARTICLES PRODUCED THEREBY

CROSS-REFERENCE TO RELATED APPLICATIONS

The present application is a 371 of International application PCT/EP2019/025330, filed Oct. 2, 2019, which claims priority of DE 10 2018 007 756.0, filed Oct. 2, 2018, the priority of these applications is hereby claimed and these applications are incorporated herein by reference.

BACKGROUND OF THE INVENTION

The invention relates to an oven-hardenable modeling material and its use and objects manufactured therewith.

Plastic, oven-hardenable materials for shaping and modeling objects are known in principle.

Modeling materials are also to be understood as so-called clays or, for materials containing polymers, polymer clays.

For example, DE 25 15 757 C3 discloses a plastic material that can be deformed and hardened by heating.

Such a material consists essentially of polyvinyl chloride, filler and plasticizer. The plasticizer is present in a phthalate-containing form in a content of up to 30% by weight.

DE 10 2005 059 143 A1 further discloses a modeling material which, in addition to binders, has plasticizers in a phthalate-free form.

The disadvantage of the above-mentioned materials is that the surfaces of the modeled products are smooth and usually reflect the surface structure of the processing tool.

DE 20 2009 002 221 U1 discloses a plastic material which has a PCL, a biodegradable plastic, as a plastisol. The material contains fiber materials and/or cellulose fibers as fillers. These plastic materials are used in the hobby domain, for example, to manufacture jewelry or as an impression material.

DE 10 2005 011 692 A1 describes a plastically deformable material which, in addition to binders and water, also has fillers in the form of fibers made of cellulose and plastics. This material is suitable as a modeling material for the manufacture of objects, as an impression material for replicating objects and as a smoothing material for filling and leveling out unevenness.

A disadvantage of such materials according to DE 20 2009 002 221 U1 and DE 10 2005 011 692 A1 is that these materials form a smooth surface without structures during modeling.

SUMMARY AND DESCRIPTION OF THE INVENTION

The object of the invention is therefore to create a modeling or molding material which does not have the disadvantages mentioned at the outset and which, in particular after the modeling process, automatically, that is, without the aid of tools and/or other aids, forms a surface structure which, in particular, can be perceived visually and/or haptically.

A further object of the invention is that both visual and haptic, leather-like effects/structures can be reproduced using the modeling material according to the invention.

This object is achieved by a modeling material consisting at least of a binder, which is present as a plastisol and, possibly further additives, the plastisol being essentially composed of PVC and plasticizer. The material contains at least one filler made of plastic fibers.

Surprisingly, it has been shown that the addition of branched plastic fibers as fillers in modeling material mixtures before the hardening process forms a structured surface design that can be perceived visually and/or haptically.

The particular advantages of the materials according to the invention lie in the surface structure that forms automatically, in particular during modeling. The surface structure of leather may be mentioned as an example, which can be realized using the material according to claim 1 simply and without additional effort, such as an additional work step and/or structural tool. In addition to the visual effect of the surface structure, a haptic effect is also achieved, which is not characteristic in the smooth surfaces of the materials according to the prior art.

The modeling material according to the invention consists of a binder, plasticizer, and at least one filler which is in the form of plastic fibers.

The binder used consists essentially of plastisol. This plastisol is essentially composed of PVC and plasticizer. The PVC here can be an emulsifier-containing or emulsifier-free emulsion PVC, suspension PVC and microbead suspension PVC or a mixture of the individual PVC types.

The plasticizer used can be present in the present materials as a phthalate-containing and/or phthalate-free plasticizer.

A particularly preferred embodiment of the invention is a material which is free from phthalate-containing plasticizers.

Phthalate-free plasticizers are constructed based, for example, on citric acid, adipic acid and/or benzoate ester.

Examples of phthalate-free plasticizers to be mentioned may, for example, be acetyl tributyl citrate, tri-(2-ethylhexyl)-actyl citrate, trioctyl citrate, tridecyl citrate, tributyl citrate, trihexyl citrate, triethyl citrate, dioctyl adipate, diisodecyl adipate, diisononyl adipate, bis (2-ethylhexyl) adipates, 1,2-cyclohexanedicarboxylic acid diisononyl ester, acetic acid esters of monoglycerides, benzoates or a mixture of at least two of these substances.

The plasticizer can further belong to the group of benzoates or benzoate esters. Its 2,2,4-triethyl-1,3-pentanediyl dibenzoate and derivatives thereof, triethylene glycol dibenzoate, diethylene glycol dibenzoate, diethylene glycol monobenzoate and/or propylene glycol dibenzoate may be mentioned as examples. Any mixtures of all of the aforementioned plasticizers are possible.

Phthalate-containing plasticizers can be, for example, diethylhexyl phthalate, 1,2-benzenedicarboxylic acid, cyclohexanedicarboxylic acid ester, phthalic acid diisononyl ester and phthalic acid diisodecyl ester.

The modeling material has a plasticizer content of 24-38% by weight. The material preferably contains 28-36% by weight of plasticizer.

Surprisingly, it has been shown that the use of plastic fibers as a filler in the composition of the modeling material forms or becomes a surface structure that comes very close to the structure of leather. This structure forms automatically. It has proven to be particularly advantageous when the plastic fibers are branched.

The plastic fibers are, for example, polyolefin fibers and/or polyester fibers. Polyolefin fibers can be present as polypropylene fibers or polyethylene fibers and mixtures of these fibers.

Polyester fibers can be present as polyethylene terephthalate fibers.

The material has 2-10% by weight, preferably 3-8% of plastic fibers.

It has also been found to be advantageous when the fibers have a length of 0.20-1.05 mm, preferably 0.35 to 0.95 mm. Depending on the length of the fibers, the effect of the formed structures can be more or less strong, or have finer or rather coarse structures/surface structures.

The fiber thickness here is in the range from 0.25 to 0.60 μm.

In addition to the plastic fibers used as fillers, further fillers in the form of inorganic and/or organic fillers are used. Kaolin, chalk, talc, aluminum hydroxide and/or powdered clay, which have a grain size <250 μm, preferably less than 100 μm, may be mentioned as examples.

Metal glitter, glitter or mixtures of these substances can be present as further fillers in order to achieve special visual effects, for example.

So-called lightweight fillers can also be used as fillers or other fillers mentioned can be added, which are present in the form of commercially available hollow glass microspheres or hollow plastic spheres.

A stabilizer in such a modeling material improves the PVC stability, that is, it prevents, among other things, the elimination of hydrogen chloride. Inorganic and organic salts of the metals calcium, zinc, tin, magnesium, sodium and potassium are mainly used for this purpose, for example, calcium stearate, sodium stearate, potassium stearate, zinc stearate, magnesium stearate, tin stearate and/or mixtures of the metal salts.

Pigments can be present as colorants in pure form, as powder pigments, as pigment preparations, preferably as azo-free color pigment, effect pigment and/or azo-free laked dye. A plurality of possible color pigments may be mentioned as a selection: Pigment Yellow 14 (C.I. 21095), Pigment Red 254 (C.I. 56110), Pigment Orange 34 (C.I. 21110) Pigment Red 122 (C.I. 73915) Pigment Green 7 (C.I. 74260), Pigment White 6 (C.I. 77891), Pigment Black 7 (C.I. 77266), Pigment Red 101 (C.I. 77491), Pigment Violet 23 (C.I. 51319), Pigment Blue 29 (C.I. 77007), Pigment Yellow 185 (C.I. 56290), Pigment Yellow 1 (C.I.11680), Pigment Red 48:2 (C.I. 15865:2), Pigment Red 53:1 (C.I. 15585:1), Pigment Orange 34 (C.I. 21115), Pigment Yellow 83 (C.I. 21108) and Pigment Blue 15 (C.I. 74160).

The addition of these colorants gives the modeling material or the objects produced therewith, such as leather-like objects/imitations of leather, a brilliant appearance.

Pearlescent pigments, mica iron metal luster pigments, polyester glitter pigments and luminescent pigments may be specified as further colorants.

It can be determined here that differently colored modeling materials can also be admixed, mixed or kneaded with one another at will, thereby creating a marbling effect.

The invention will be illustrated in more detail using a framework example and a few formulation examples.

FRAMEWORK EXAMPLE 45-65% by weight of PVC or PVC copolymer
24-38% by weight of plasticizer
2-10% by weight of plastic fibers
5-20% by weight of fillers
0-5% by weight of colorant
0-5% by weight of other additives Stabilizers and co-stabilizers are examples of possible other additives.

Formulation Example 1—Brown Modeling Material (Phthalate-Free)

57% by weight of E-PVC or S-PVC
29% by weight of citrate-based plasticizer
4% by weight of polyethylene fibers
4% by weight of Zn stearate
2% by weight of silica
3% by weight of chalk
1% by weight of colorant (brown mixture)
The brown mixture is composed as follows
0.25% by weight of Pigment White 6
0.4% by weight of Pigment Red 254
0.15% by weight of Pigment Black 7
0.2% by weight of Pigment Yellow 83

Formulation Example 2—Red Material (Containing Phthalate)

51% by weight of E-PVC or S-PVC
25% by weight of dieethylhexyl phthalate
5% by weight of polypropylene fibers
16% by weight of aluminum silicate
2% by weight of stearates
1% by weight of Pigment Red 254

Formulation Example 3—Yellow Material (Phthalate-Free)

59% by weight of E-PVC or S-PVC
30% by weight of citrate-based plasticizer
4.5% by weight of polyester fibers
2.5% by weight of stearates
3.5% by weight of filler (chalk, silica)
0.5% by weight of Pigment Yellow 83

A desired consistency of the material can easily be adjusted by varying the binder content and/or plasticizer content.

If the surfaces of the manufactured objects are to be formed smooth when processing the material according to the invention by high pressure or when using a roller, the leather-like structure can be formed again on the surface by small movements/deformations of layers/regions close to the surface or light pulling.

The hardening temperature of such materials is 110 to 130° C., preferably 130° C., with a hardening time of up to 30 minutes.

The preparation of the material according to the invention is carried out in principle as described in DE 25 15 757 C3, after which the dry PVC powder is mixed with the filler, and the plasticizer and co-stabilizer is added thereafter. The material produced in this way is possibly finished by kneading while keeping it cool.

The material according to the invention is used as a modeling material in the manufacture of materials that are plastic, manually deformable and hardenable by heating.

The modeling material according to the invention is particularly suitable for the manufacture of products which are very similar to leather in terms of haptic and visual characteristics, the leather-like products having a structured surface. Such products can be manufactured in thin layers, as is customary for leather goods, by shaping them by rolling them out, for example, using a rolling pin.

The filler, cross-linked fibers made of plastic, automatically forms a structure on the surface that visually and haptically approaches the structure of leather.

The layer thickness of the modeling material here corresponds to the approximate thickness of leather. Leather thicknesses are mostly in the range from 0.8 mm to 2.4 mm. On the basis of the specified hardening time and hardening temperature of the material according to the invention, it can be seen that the thin leather-like layers in the hardened form have a leather-like character with regard to flexibility and pliability.

A "texture analyzer" was used to determine the elasticity of the hardened material.

Using the "texture analyzer", a maximum deflection of 15.8 mm could be measured/determined for a round breaking bar having a radius of 5 mm, which was hardened at 130° C. for 30 minutes, with a maximum force of 91 N.

Surprisingly, it has been shown that the modeling material according to the invention, in the hardened state, is characterized by high flexibility, good cuttability and, in thin layers and in strip form, good braidability.

The invention further relates to articles and objects manufactured from a modeling material according to claim 1, the material having been hardened by the action of heat after shaping for designing the articles and objects, having a structured, haptically and visually leather-like surface.

The manufactured objects are bendable and supple before and after hardening, as is known from leather. After hardening, the objects are stable against tensile forces, even in the form of thin layers.

The invention claimed is:

1. A hand-deformable modeling material, comprising: a binder that is a plastisol; at least one filler; and selectively further additives, the plastisol being substantially composed of PVC and plasticizer, wherein the at least one filler is present as plastic fibers, wherein the plastic fibers have a length of 0.20-1.05 mm, and wherein the plastic fibers are branched so as to form a structured surface on the modeling material when hardened, the structured surface being at least one of visually and haptically perceivable, the binder, the at least one filler and the further additives being present in quantities that make the modeling material hand-deformable.

2. The material according to claim 1, wherein the material has 2-10% by weight plastic fibers.

3. The material according to claim 2, wherein the material has 3-8% by weight plastic fibers.

4. The material according to claim 1, wherein the plastic fibers have a length of 0.35 to 0.95 mm.

5. The material according to claim 1, wherein the plastic fibers are formed as polyolefin fibers and/or polyester fibers.

6. The material according to claim 5, wherein the polyolefin fibers are present as polypropylene fibers, polyethylene fibers or as mixtures of these fibers.

7. The material according to claim 1, wherein the material is composed of
   45-65% by weight PVC or PVC copolymer,
   24-38% by weight plasticizer,
   2-10% by weight plastic fibers,
   5-20% by weight fillers other than plastic fibers,
   0-5% by weight colorants and
   0-5% by weight other additives.

8. The material according to claim 1, wherein the material has phthalate-containing and/or phthalate-free plasticizers.

9. A method for producing a product that is very similar to leather in terms of haptic and visual characteristics, the leather-like product having a structured surface, comprising the steps of: providing a modeling material according to claim 1; and producing the leather-like product from the modeling material.

10. The method according to claim 9, including shaping the material to form the product and curing the material with heat after shaping.

\* \* \* \* \*